United States Patent
Yu (10) Patent No.: US 7,477,465 B2
(45) Date of Patent: Jan. 13, 2009

(54) METHOD OF PROTECTING DATA ON RECORDING MEDIUM AND RECORDING MEDIUM STORING PROGRAM FOR EXECUTING THE METHOD

(75) Inventor: Seong-hwan Yu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 248 days.

(21) Appl. No.: 11/401,940

(22) Filed: Apr. 12, 2006

(65) Prior Publication Data

US 2006/0233077 A1    Oct. 19, 2006

(30) Foreign Application Priority Data

Apr. 12, 2005   (KR) .................. 10-2005-0030437

(51) Int. Cl.
*G11B 5/09*    (2006.01)
(52) U.S. Cl. .......................... 360/31; 360/53
(58) Field of Classification Search .............. None
See application file for complete search history.

(56) References Cited

U.S. PATENT DOCUMENTS 6,798,598 B2 *  9/2004  Suzuki et al. ................. 360/68
7,196,860 B2 *  3/2007  Alex ............................ 360/31
2003/0133214 A1   7/2003  Miller et al.
2004/0193798 A1 *  9/2004  Kuwamura ................. 711/114
2006/0066971 A1 *  3/2006  Alex et al. .................... 360/31

FOREIGN PATENT DOCUMENTS

| JP | 06-251323 | 9/1994 |
| JP | 07-287942 | 10/1995 |
| KR | 1020040052030 | 6/2004 |

* cited by examiner

*Primary Examiner*—Andrea L Wellington
*Assistant Examiner*—Varsha Kapadia
(74) *Attorney, Agent, or Firm*—Staas & Halsey LLP (57) ABSTRACT

A method of protecting data on a recording medium against an adjacent track erase (ATE) effect, and a recording medium having a program therefor are provided. The method includes accumulating a number of turns of write operations in respective sub-areas, wherein the recording medium is divided into a plurality of sub-areas; and rewriting data on a sub-area of which an accumulated number of turns of write operations is greater than a limited number of turns of write operations. Accordingly, before data written on an adjacent track can be damaged by the ATE effect, data is rewritten and safely preserved.

11 Claims, 5 Drawing Sheets

METHOD OF PROTECTING DATA ON RECORDING MEDIUM AND RECORDING MEDIUM STORING PROGRAM FOR EXECUTING THE METHOD

CROSS-REFERENCE TO RELATED APPLICATIONS

This application claims the benefit of Korean Patent Application No. 10-2005-0030437, filed on Apr. 12, 2005, in the Korean Intellectual Property Office, the disclosure of which is incorporated herein in its entirety by reference.

BACKGROUND OF THE INVENTION

1. Field of the Invention

The present invention relates to a method of protecting data on a recording medium, and more particularly, to a method of protecting data against an adjacent track erase (ATE) effect, and a recording medium storing a program for executing the method.

2. Description of the Related Art

A hard disk drive (HDD) is a recording device used for storing information. Generally, information is written on concentric tracks on one surface of one or more magnetic recording disks. The disk is rotatably mounted on a spindle motor, and information is accessed by a read/write head mounted on an actuator arm that is rotated by a voice coil motor. The voice coil motor is excited by a current to rotate the actuator and move the read/write head. The read/write head detects the occurrence of a magnetic change on the surface of the disk and reads the information recorded on the surface of the disk. To write information on a data track, a current is supplied to the read/write head and a magnetic field is created, thereby magnetizing the surface of the disk.

By reducing the distance between the head and the disk, the recording density can be increased. To reduce the distance, the size of the head is reduced and the head is disposed as close as possible to the disk. However, if the distance between the head and the disk is reduced, overwrite on adjacent tracks may occur from the magnetic field caused by the head, and thus data written on the adjacent tracks is deleted by an ATE effect.

Meanwhile, write parameter-setting methods capable of minimizing the ATE effect are disclosed in Japanese Patent Publication No. 2004-199860 (published Jul. 15, 2004), U.S. Patent Application Publication Ser. No. 2004-25874 (Mar. 24, 2004), and Korea Patent Publication No. 2004-52030 (Jun. 19, 2004).

However, the ATE effect is stronger when iterative recording is performed on a predetermined track. Thus, there is a need for a method of protecting data recorded on a recording medium.

SUMMARY OF THE INVENTION

Additional aspects and/or advantages of the invention will be set forth in part in the description which follows and, in part, will be apparent from the description, or may be learned by practice of the invention.

The present invention provides a method of protecting data on a recording medium in order to minimize loss of data due to an ATE effect.

The present invention also provides a computer-readable recording medium having embodied thereon a computer program for executing the method of protecting data.

One aspect of the present invention is to provide a method of protecting data in order to prevent weakening of data written on a recording medium by iterative write operations, the method including the steps of: accumulating a number of turns of write operations in respective sub-areas, wherein the recording medium is divided into a plurality of sub-areas; and rewriting data on a sub-area in which an accumulated number of turns of write operations is greater than a limited number of turns of write operations.

The step of rewriting data includes: counting a number of turns of retry operations of respective sectors while reading data in the sub-area; and rewriting data in the sub-area entirely if there is a sector where a counted number of turns of retry operations is greater than a limited number of turns of retry operations.

The step of rewriting data includes: counting a number of turns of retry operations of respective sectors while reading data in units of blocks, wherein a size of a block is greater than the sector, from the sub-area; and rewriting data in the block if there is a sector of which a counted number of turns of retry operations is greater than a limited number of turns of retry operations.

The step of rewriting data may be performed in a state where the recording medium is not accessed by an external apparatus.

According to another aspect of the present invention, there is provided a computer-readable recording medium having embodied thereon a computer program for executing a method of protecting data in order to prevent weakening of data written on a recording medium by iterative write operations, wherein the method includes the steps of: accumulating a number of turns of write operations in respective sub-areas, wherein the recording medium is divided into a plurality of sub-areas; and rewriting data on a sub-area in which an accumulated number of turns of write operations is greater than a limited number of turns of write operations.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In the description of the structure and operation of the present invention, an example of applying the present invention to a hard disc drive (HDD) will be explained. However, it should be noted that the present invention is not limited to the HDD.

In the method of protecting data according to the present invention, a recording area of a recording medium is divided into a plurality of sub-areas. Whenever a write operation is performed, a number of turns of the write operations, that is, a write-count is accumulated, and if the accumulated number of turns of write operations is greater than a predetermined limited number of turns of write operations, data is rewritten in the corresponding sub-area. The limited number of turns of write operations being compared with the accumulated number of turns of write operations is set to a value at which the ATE effect is generated by iterative recording.

The rewriting of data in the sub-area in which the accumulated number of turns of write operations is greater than the limited number of turns of write operations is performed while an external device does not access the recording medium, that is, when there is no access by the external device to the recording medium for a predetermined time. In the rewriting operation in the corresponding sub-area, data in the sub-area is read in units of blocks, each block being greater than a basic data write unit (sector), and if a number of turns of retry operations (retry count) in any sector exceeds a predetermined limited number of turns of retry operations, data is rewritten in the block corresponding to that sector.

As well known, a disk is divided into a plurality of zones (Z1~Zn). For convenience of explanation, a sub-area in the present invention will be regarded as a zone.

In the present invention, the write count is managed in each zone separately. That is, whenever a write operation is performed in each zone, the write count in the zone is accumulated. Here, the write operations are regarded as different ones only when each operation occurs after a time interval long enough to distinguish it from another write operation. For example, if a predetermined zone is accessed in a write operation, and to write data therein the zone is again accessed in another write operation, those write operations are determined to be different ones and the number of turns of write operations is accumulated by 1.

Figure 1:
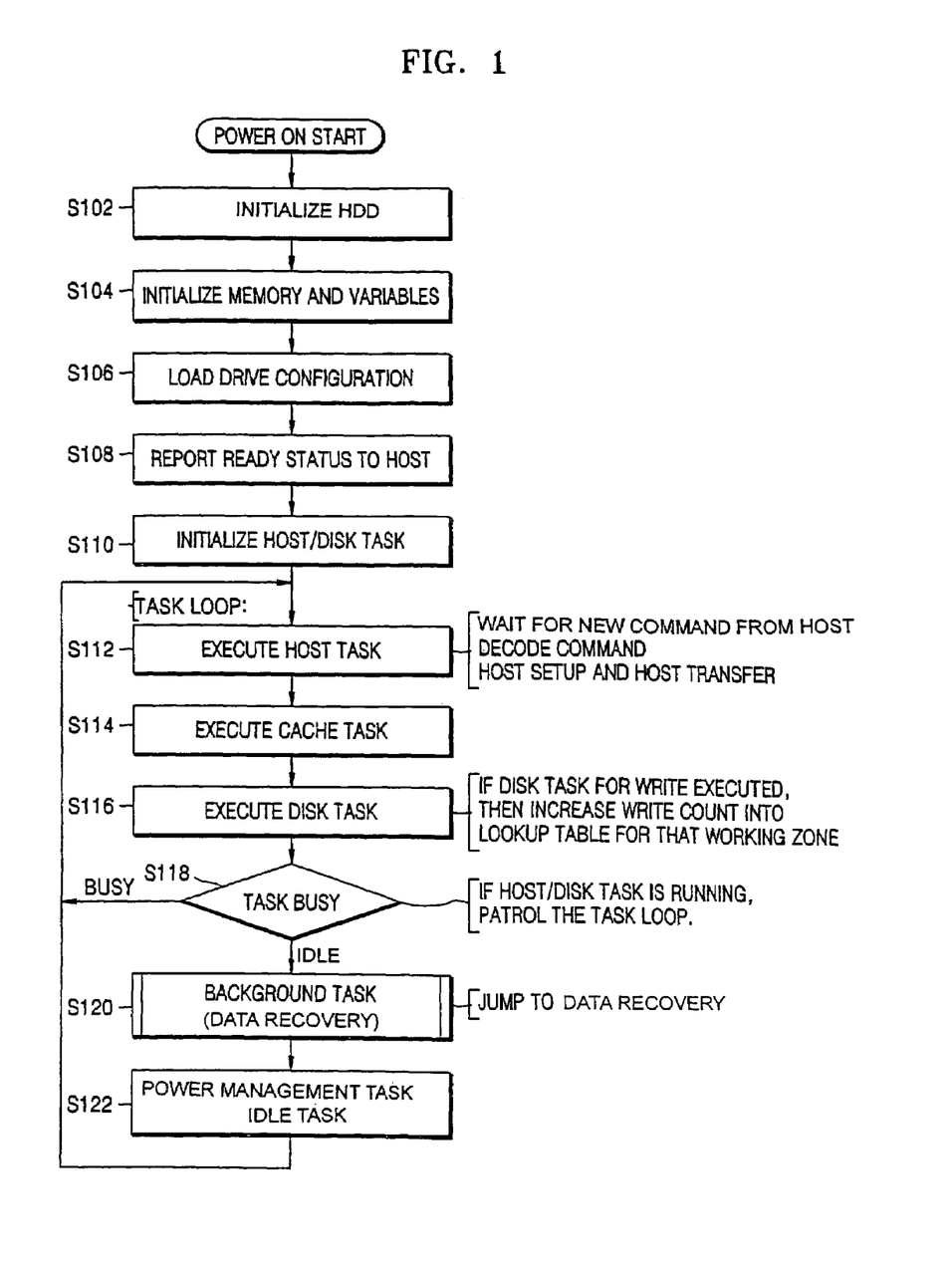
FIG. 1 is a flowchart of a method of protecting data according to an embodiment of present invention.

FIG. 1 is a flowchart of a method of protecting data according to embodiment of the present invention. When power is turned on, an HDD is initialized in operation S102. A memory and variables are initialized in operation S104.

Drive configuration values are loaded in operation S106. A ready status is reported to a host computer in operation S108. A host/disk task is initialized in operation S110.

The host task is performed in operation S112. For example, waiting for a new command from the host computer, interpretation of a received command, or setting up the host and transmission to the host computer, may be performed. A cache task is performed in operation S114. A disk task is performed in operation S116.

If the disk task is for writing data, a zone corresponding to the task is accessed, data is written therein, and a corresponding number of turns of write operations of the zone is accumulated by 1. The number of turns of write operations for every zone are stored in a lookup table.

It is determined whether or not the status is a busy status, that is, whether or not there is a task to be performed, in operation S118. In other words, it is determined whether or not a host/disk task is being performed. If the status is a busy status, the task is continuously performed, by returning to the operation S112. If the status is not a busy status in operation S118, a background task is performed in operation S120.

The background task includes the data recovery process in which a rewriting operation is performed by referring to the write-turns for each zone. A power management task is performed in operation S122. In the power management task, a series of processes are performed for finally parking a head with respect to the continuation time of an idle state.

Figure 2A:
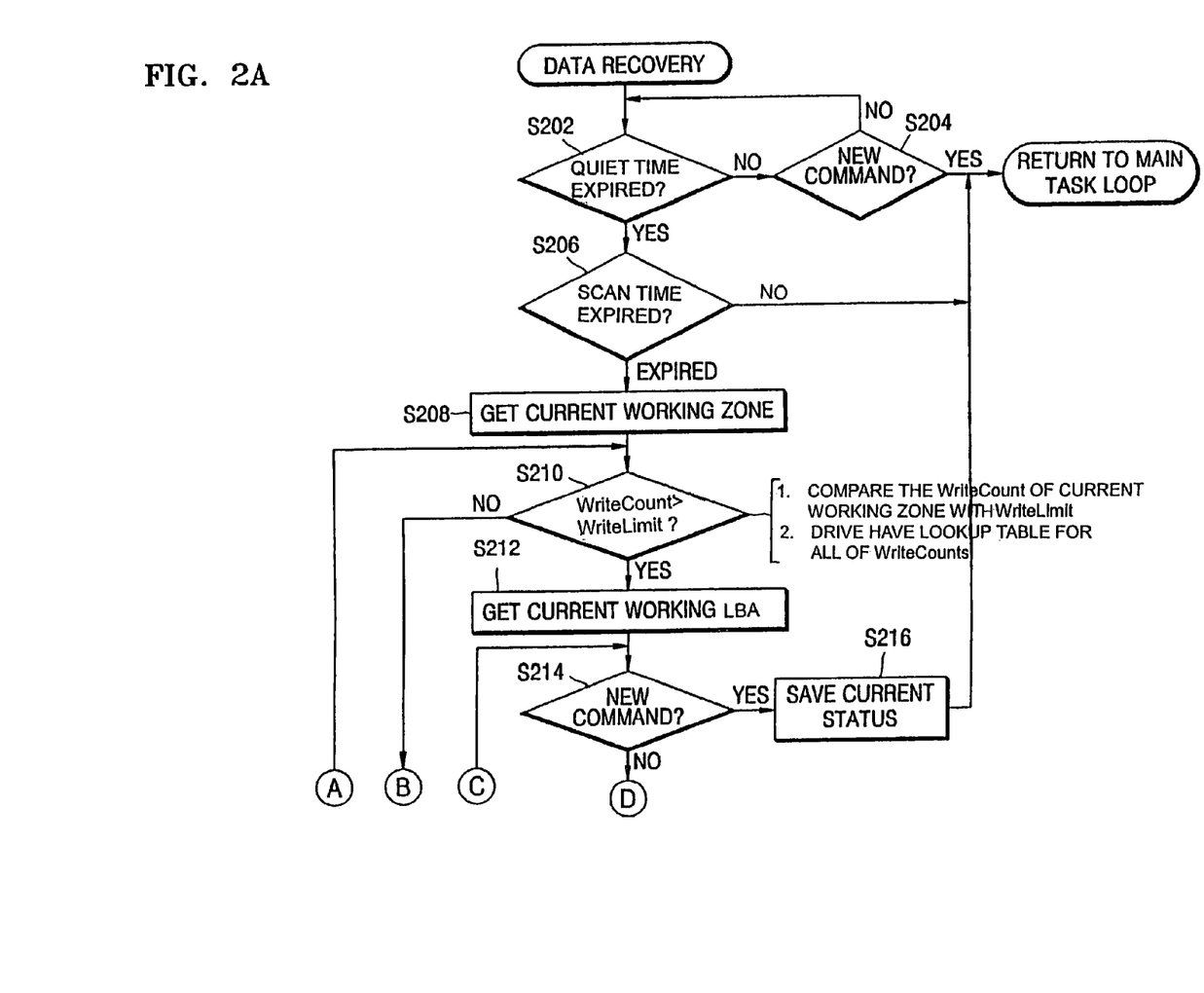
FIGS. 2A and 2B are detailed flowcharts of a data recovery process shown in FIG. 1.
Figure 2B:
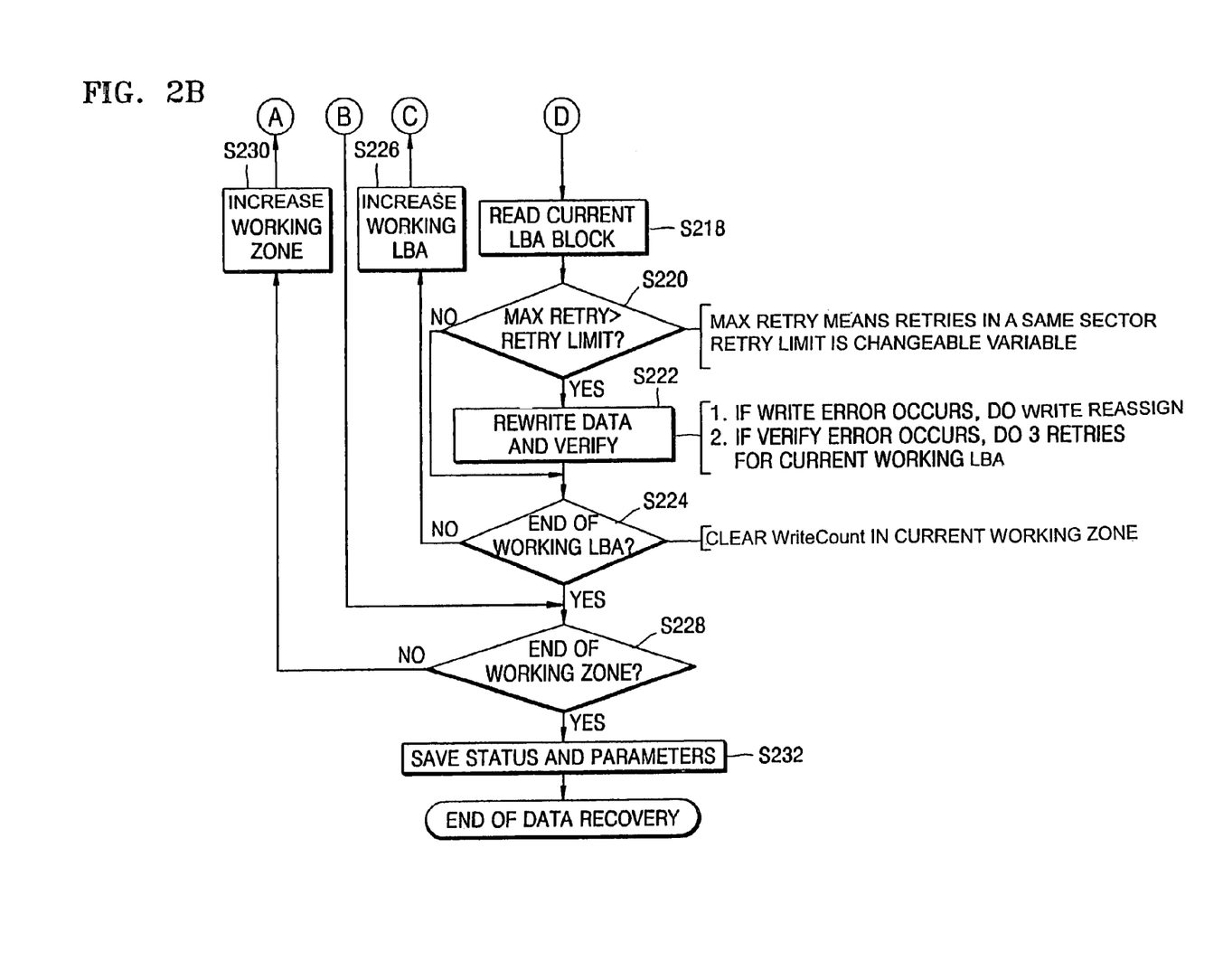

FIGS. 2A and 2B are detailed flowcharts of an operation for the data recovery process shown in FIG. 1. The data recovery process is performed when the HDD is not in a busy status, that is, as a background task.

If the HDD is not in the busy status, the data recovery process waits until a quiet time elapses. For example, the quiet time can be set to 4 seconds. The reason for this is because it is highly probable that after a predetermined task is performed, a following task will occur. Accordingly, by delaying the data recovery operation for the quiet time, repetition of an undesirable operation can be avoided. The quiet time is set when the previous data recovery process is stopped without completion of the process. If a new command is generated during the quiet time in operation S204, a main routine shown in FIG. 1 is performed again. The data recovery process waits until a scan time elapses in operation S206.

The scan time is a time for ensuring that an amount of time is elapsed when a busy status is finished. If the scan time has not elapsed, the main routine shown in FIG. 1 is performed again. For example, the scan time can be set to one day. If the scan time has elapsed, an operation for rewriting data by referring to the accumulated number of turns of write operations WriteCount in relation to a sub-area begins.

Information on a current working zone is obtained from the lookup table in operation S208. The working zone is a variable indicating a zone in which a data recovery process is to be performed.

A determination is made as to whether or not the accumulated number of turns of write operations [count] is greater than a predetermined value (a limited number of turns of write operations) in operation S210. If the accumulated number WriteCount is not greater than the limited number WriteLimit, operation S228 is performed, which makes a determination as to whether or not a current working zone is the last working zone.

If the accumulated number is greater than the limited number WriteLimit, a current working logical block address (LBA) is obtained in operation S212. The working LBA is a variable indicating an address on the disk in which the data recovery operation is to be performed.

It is examined whether or not there is a new command in operation S214. If there is a new command, the current status is stored in operation S216 and the main routine of FIG. 1 is performed again. If there is no new command, data is read from the obtained LBA in units of blocks in operation S218.

The block is greater than a basic write unit (sector). The size of the block may be fixed, but preferably, is variable. This is because an available capacity in a buffer of an HDD varies with respect to the performing status of a task, and changing the size of data to be read with respect to an available capacity of the buffer is more efficient.

It is determined whether or not a number of turns of retry operations for reading data MaxRetry is greater than a predetermined value that is a limited number of turns of retry operations RetryLimit in operation S220. In an HDD, whether or not read sector data is correct is examined by using an error correction code and the like, and if the data is not correct, a retry operation for again reading data is performed by changing an off-track amount or a parameter to read. The retry operation is repeatedly performed until the data is read correctly or it is determined that it is impossible to read the data.

Accordingly, the number of turns of retry operations performed to obtain correct data indicates the degree of damage of the recorded data. Also, the limited number of turns of retry operations RetryLimit is set to a value corresponding to a damage degree at which data can be lost if a write operation is further performed because there is already a considerable degree of the ATE effect.

If the number of turns of retry operations MaxRetry is greater than the limited number of turns of retry operations RetryLimit, data is rewritten for the block entirely in operation S222.

In the present invention, if the number of turns of retry operations in a sector is greater than the limited number of turns of retry operations MaxRetry, data is rewritten. The rewriting operation is performed in the entire block, including a sector in which the number of turns of retry operations MaxRetry exceeds the limited number of turns of retry operations RetryLimit. Rewriting data only in the sector in which the number of turns of retry operations MaxRetry exceeds the limited number of turns of retry operations RetryLimit would be enough. However, if data is rewritten only in the sector, the load to search for the sector is great. Therefore, by rewriting data in the entire block including the sector, the load can be reduced. In rewriting data in operation S222, if a write error occurs, (i.e., there is a defective sector), a defect handling process, that is, reassigning, is performed.

If a verification error of written data occurs, a retrial is performed. It is then determined whether an LBA is the last LBA of the working zone in operation S224.

If the LBA is not the last LBA, the value of the working LBA is increased by the size of one block in operation S226, and the operation in S214 is performed. If the LBA is the last LBA, the accumulated number of turns of write operations WriteCount for the working zone is cleared. It is then examined whether or not a current working zone is the last working zone in operation S228.

If the current zone is not the last working zone, the value of the working zone is increased by 1 in operation S230, and operation S210 is performed. If the current zone is the last working zone, the status and parameters are stored in operation S232 and the data recovery process is finished.

Information indicating the status includes stop without completion, completion of the previous data recovery operation, the quiet time, and the scan time. Parameters include the number of write zones, the number of tracks in each zone, the accumulated number of turns of write operations WriteCount, the counted number of turns of retry operations MaxRetry, and the current scan count, which is the number of scans of the recording medium. The status and parameters are stored in the lookup table.

The quiet time or the scan time indicates an execution time, that is, a lapse of time with the HDD turned on.

Among the parameters, the current scan count is to prepare for a thermal decay phenomenon. Though not shown in FIG. 2, it is preferable that a rewriting operation is also performed when no write operation is performed in a predetermined sub-area for a predetermined time. This is needed to prevent the thermal decay phenomenon in which written data becomes weaker naturally by not being accessed for a long time.

For example, whenever the current scan count is 180 (6×30), that is, every 6 months, the recording medium is scanned entirely, and if there is a sector in which the counted number of turns of retry operations MaxRetry is greater than the limited number of turns of retry operations RetryLimit, data in the sector of the block where the sector belongs is rewritten. Then, the scan count is reset.

Figure 3:
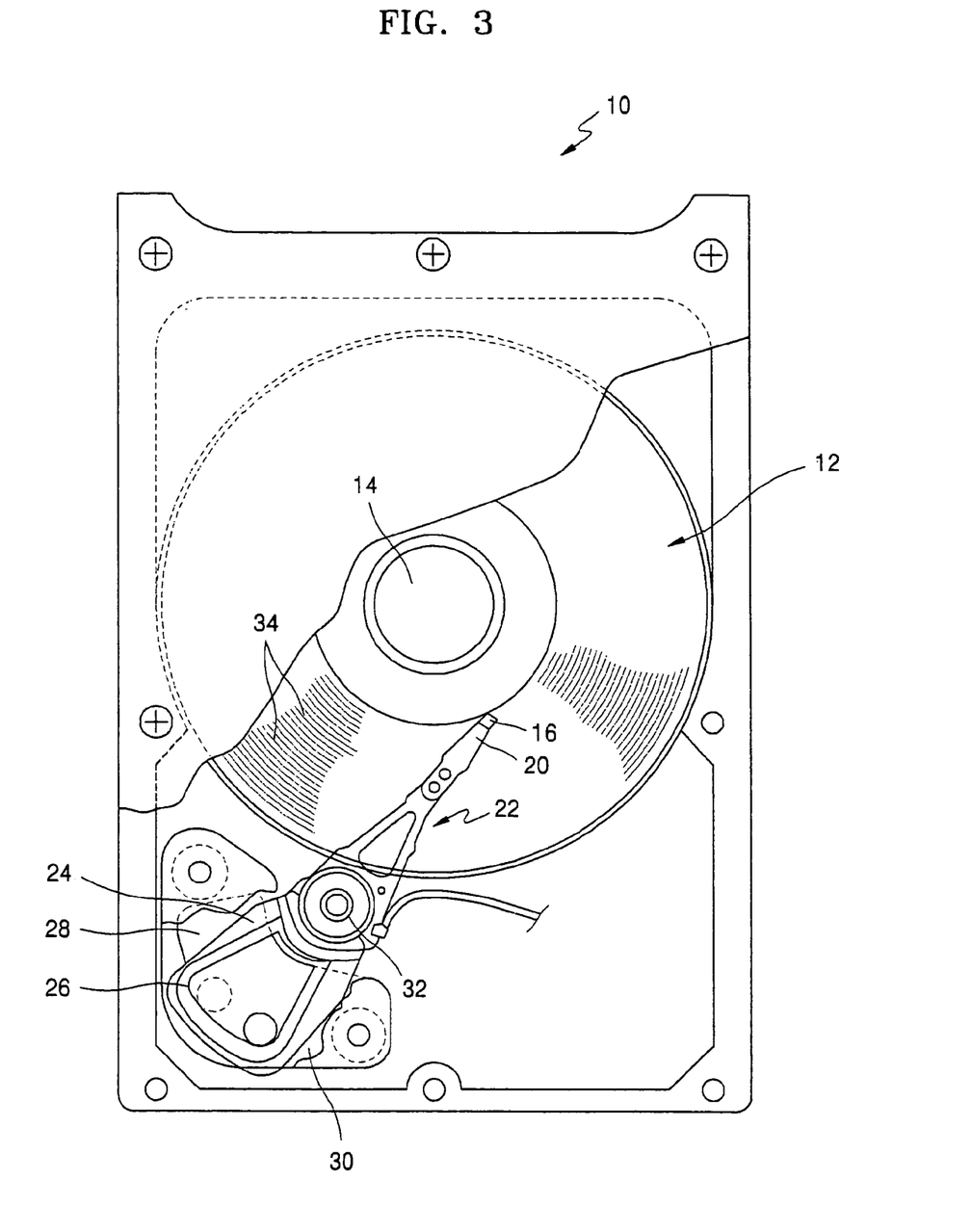
FIG. 3 illustrates the structure of a hard disc drive (HDD) to which the present invention is applied.

FIG. 3 illustrates the structure of a hard disc drive (HDD) to which the present invention is applied.

The HDD 10 shown in FIG. 3 includes at least one disc 12 rotated by a spindle motor 14. The HDD 10 further includes a transducer 16 positioned near to the surface of the disc 12. The transducer 16 senses a magnetic field of the disc 12 or magnetizes the disc 12 to read or write data from or onto the rotating disc 12. Typically, the transducer 16 is coupled with the surface of each disc 12. Though one transducer 16 is described herein, it should be understood that the transducer 16 is formed with a writing transducer that magnetizes the disc 12 and a reading transducer that senses the magnetic field of the disc 12.

The transducer 16 may be integrated into a slider 20. The slider 20 has a structure in which an air bearing is created between the transducer 16 and the surface of the disc 12. The slider 20 is combined with a head gimbal assembly 22.

The head gimbal assembly 22 is attached to an actuator arm 24 having a voice coil 26. The voice coil 26 is positioned close to a magnetic assembly 28 that defines a voice coil motor (VCM) 30. Current applied to the voice coil 26 generates torque that causes the actuator arm 24 to rotate around a bearing assembly 32. The rotation of the actuator arm 24 may allow the transducer 16 to move across the surface of the disc 12.

Typically, information is stored in annular tracks 34 of the disc 12. Each track 34 generally has a plurality of sectors. There is a servo sector and a data sector. The servo sector is formed at least with a gray code to distinguish a sector and a track (cylinder). The transducer 16 moves across the surface of the disc 12 to read information from or to write information in another track.

Figure 4:
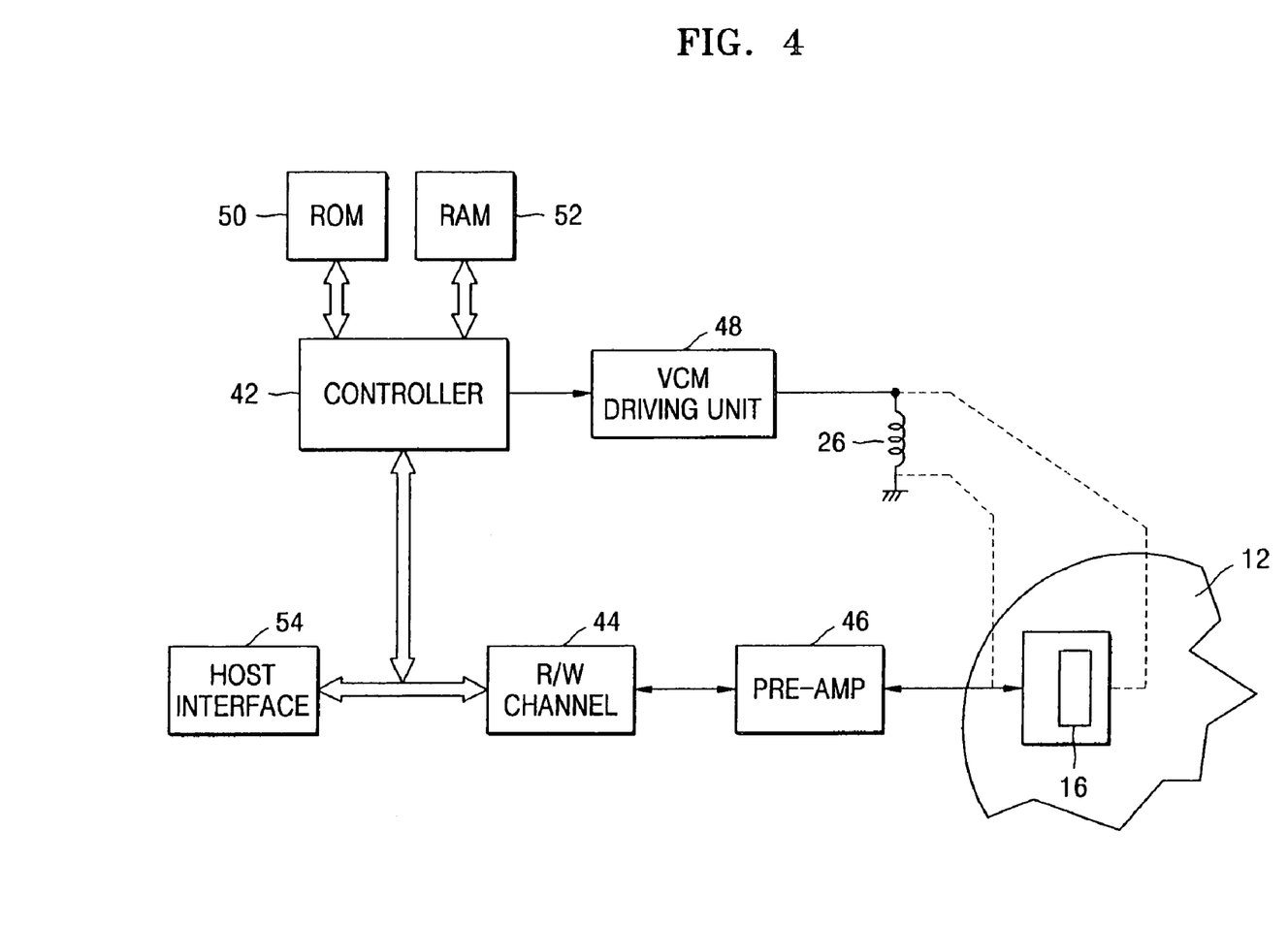
FIG. 4 illustrates an electric system capable of controlling the HDD shown in FIG. 3.

FIG. 4 illustrates an electric system capable of controlling the HDD shown in FIG. 3. The electric system shown in FIG. 4 includes a controller 42 connected to the transducer 16 via a read/write (RAV) channel circuit 44 and a pre-amp circuit 46. The controller 42 may be a digital signal processor (DSP), a microprocessor, a microcontroller, or the like. The controller 42 provides a control signal to the RNV channel 44 to read or write data from or onto the disc 12. Generally, information is transmitted from the RNV channel 44 to a host interface circuit 54. The host interface circuit 54 includes a buffer memory and a control circuit to interface with a system such as a personal computer.

The controller 42 is also connected to a VCM driving circuit 48 supplying a driving current to the voice coil 26. The controller 42 provides a control signal to the VCM driving circuit 48 in order to control the excitation of the VCM 30 (shown in FIG. 3) and the movement of the transducer 16.

The controller 42 is connected to a non-volatile memory 50 such as a read only memory (ROM) and a flash memory device, and a random access memory (RAM) device 52. The memory devices 50 and 52 include commands and data used by the controller 42 to execute a software routine.

One software routine is a search control routine for moving the transducer 16 from one track to another track. The search control routine includes a servo control routine to guarantee the movement of the transducer 16 to an exact track.

Also, a program to execute the method of protecting data according to the present invention described with reference to FIGS. 1 and 2 is stored in the memory device 50.

When the HDD 10 is not in a busy status, the controller 42 performs the data recovery routine as shown in FIG. 2. The controller 42 reads data in units of blocks from the disc 12 and by referencing the counted number of turns of retry operations MaxRetry of each sector, determines whether or not to rewrite data in the block. If the counted number of turns of retry operations MaxRetry of a sector exceeds the limited number of turns of retry operations RetryLimit, data in the entire block is rewritten so that weakening of the data by the ATE can be prevented.

Meanwhile, the controller 42 scans the entire disc 12 once every 6 months. In this case, for example, data in sectors in which the counted number of turns of retry operations MaxRetry is greater than the limited number of turns of retry operations RetryLimit, for example, 5 times is rewritten to prevent the thermal decay phenomenon.

A number of turns of the data recovery processes may additionally be counted, and if the counted number of turns of data recovery processes MaxRetry is greater than a predetermined number of turns of data recovery processes, data is rewritten in the sectors in which the counted number of turns of data recovery processes MaxRetry is greater than a predetermined value.

The present invention can be embodied as a method, an apparatus, or a system. When it is embodied as software, elements of the present invention are code segments executing essential functions. Programs or code segments can be stored in a processor readable recording medium, or can be transmitted in a computer data signal coupled with a carrier in a transmission medium or communication networks. The processor readable medium is any medium that can store or transmit information. Examples of the processor readable medium include electronic circuits, semiconductor memory devices, read-only memory (ROM), random-access memory (RAM), flash memory, EEPROM, floppy disks, optical data storage devices, hard discs, optical fiber media, and radio frequency (RF) network. Computer data signals include any signal that can be transmitted through electronic network channels, optical fiber, air, electromagnetic field, and RF networks.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

According to the method of protecting data of the present invention, a recording area of a recording medium is divided into a plurality of sub-areas, a write count is accumulated, and if the write count is greater than a predetermined frequency, data is rewritten in the corresponding sub-area. By doing so, loss of data by the ATE can be minimized.

Also, according to the method of protecting data of the present invention, the entire recording medium is accessed at a predetermined interval and by rewriting data in sectors, each having a number of turns of retry operations greater than a predetermined value, loss of data by the thermal decay phenomenon can be minimized.

What is claimed is:

1. A method of protecting data written on a recording medium in order to prevent weakening of the data by iterative write operations, the method comprising a data recovery process comprising:
   accumulating a number of turns of write operations in respective sub-areas, the recording medium being divided into a plurality of sub-areas; and
   if the accumulated number of turns of write operations is greater than a limited number of turns of write operations, reading data in units of blocks from a sub-area, counting a number of turns of read retry operations in respective sectors while reading the data a size of a block being greater than a sector, and rewriting data in the block if there is a sector in which a counted number of turns of read retry operations is greater than a limited number of turns of read retry operations.

2. The method of claim 1, wherein the data recovery process is performed only if a predetermined time has elapsed from the completion of a previous data recovery process.

3. The method of claim 2, wherein the data recovery process is stopped after storing statuses and parameters required for the data recovery process if a command is provided by an external apparatus.

4. The method of claim 3, wherein the data recovery process restarts after waiting for a predetermined time for a command from the external apparatus.

5. The method of claim 1, wherein the rewriting data comprises:
   rewriting data on a sector in which a counted number of turns of read retry operations is greater than a limited number of turns of read retry operations.

6. The method of claim 1, wherein the rewriting data is performed in a state where the recording medium is not accessed by an external apparatus.

7. A computer-readable recording medium having embodied thereon a computer program for executing a method of protecting data written on a recording medium in order to prevent weakening of the data by iterative write operations, the method comprising a data recovery process comprising:
   accumulating a number of turns of write operations in respective sub-areas, the recording medium being divided into a plurality of sub-areas; and
   if the accumulated number of turns of write operations is greater than a limited number of turns of write operations, reading data in units of blocks from a sub-area, counting a number of turns of read retry operations in respective sectors while reading the data a size of a block being greater than a sector, and rewriting data in the block if there is a sector in which a counted number of turns of read retry operations is greater than a limited number of turns of read retry operations.

8. A method of protecting data written on a recording medium of a hard disk drive, comprising a data recovery process comprising:
   accumulating a number of turns of write operations in a portion of a recording area of the recording medium;
   if the number of turns of write operations exceeds a predetermined value, determining on the portion of the recording area;
   a current working logical block which is greater than a basic write sector reading data in the current working logical block;
   determining whether a number of turns of read retry operations on in a respective basic write sector of the current working logical block; is greater than a limit number of turns of read retry operations, and if the number of turns of read retry in the respective sector operations is greater than the retry-turns limit, rewriting data in the block.

9. The method according to claim 8, further comprising:
   determining whether or not the hard disk drive is in a busy state;
   determining whether or not a predetermined quiet time has elapsed from a previous data recovery process; and
   performing the determining whether the number of turns of read retry operations in the respective basic write sector of the current working logical block is greater than the limit number of turns of read retry operations and rewriting if the hard disk drive is not in a busy state and the predetermined quiet time has elapsed.

10. The method according to claim 8, wherein if the number of turns of read retry operations in the respective sector is greater than the read retry-turns limit data rewritten only in the sector.

11. The method according to claim 8, further comprising:

storing statuses and parameters required for the data recovery process and stopping the rewriting data if a command is provided by an external apparatus.

* * * * *

UNITED STATES PATENT AND TRADEMARK OFFICE
CERTIFICATE OF CORRECTION

PATENT NO. : 7,477,465 B2  Page 1 of 1
APPLICATION NO. : 11/401940
DATED : January 13, 2009
INVENTOR(S) : Seong-hwan Yu It is certified that error appears in the above-identified patent and that said Letters Patent is hereby corrected as shown below:

Column 8, Line 53, after "block" insert --and--.

Column 8, Line 58, change "in the respective sector operations" to --operations in the respective sector--.

Column 9, Line 4, change "wherein" to --wherein;--.

Column 9, Line 6, after "data" insert --is--.

Signed and Sealed this

Seventh Day of April, 2009

JOHN DOLL
*Acting Director of the United States Patent and Trademark Office*